(12) United States Patent
Hanson

(10) Patent No.: US 12,521,853 B2
(45) Date of Patent: Jan. 13, 2026

(54) APPARATUS AND METHOD FOR INSTALLING A FITTING ONTO FLUID LINE

(71) Applicant: Corex, LLC, Oregon City, OR (US)

(72) Inventor: Scott Hanson, Oregon City, OR (US)

(73) Assignee: Corex, LLC, Oregon City, OR (US)

( * ) Notice: Subject to any disclaimer, the term of this patent is extended or adjusted under 35 U.S.C. 154(b) by 0 days.

(21) Appl. No.: 18/700,004

(22) PCT Filed: Oct. 5, 2022

(86) PCT No.: PCT/US2022/045761
§ 371 (c)(1),
(2) Date: Apr. 10, 2024

(87) PCT Pub. No.: WO2023/064142
PCT Pub. Date: Apr. 20, 2023

(65) Prior Publication Data
US 2024/0335927 A1 Oct. 10, 2024

Related U.S. Application Data

(60) Provisional application No. 63/255,529, filed on Oct. 14, 2021.

(51) Int. Cl.
*B25B 27/10* (2006.01)
*B05B 1/20* (2006.01)
(Continued)

(52) U.S. Cl.
CPC .............. *B25B 27/10* (2013.01); *F16L 41/04* (2013.01); *F16L 41/045* (2013.01); *F16L 41/16* (2013.01); *B05B 1/202* (2013.01)

(58) Field of Classification Search
CPC ........ B25B 27/10; F16L 41/04; F16L 41/045; F16L 41/16; B05B 1/202; Y10T 137/0463
(Continued)

(56) References Cited

U.S. PATENT DOCUMENTS 2,660,192 A * 11/1953 Hunter .................... F16L 41/06
251/146
3,277,683 A * 10/1966 Knoblock ............. F16L 41/045
72/71

(Continued)

OTHER PUBLICATIONS

International Search Report and Written Opinion, mailed Jan. 18, 2023, issued for International Patent Application No. PCT/US2022/045761, 8 pages.

*Primary Examiner* — William M Mccalister
(74) *Attorney, Agent, or Firm* — Klarquist Sparkman, LLP

(57) ABSTRACT

An apparatus for installing a fitting onto a fluid line, comprising a main body and a fitting installation member. The main body comprises a base and a guide member, wherein the base comprises a groove extending in a first direction configured to receive at least a portion of the fluid line, wherein the guide member is connected to and spaced apart from the groove of the base, and wherein the guide member comprises a hole extending through the guide member in a second direction. The fitting installation member comprises an elongate shaft and a tip portion, wherein the elongate shaft extends through the hole of the guide member and into the groove of the base member, and wherein the tip portion is smaller than the shaft in a first dimension.

19 Claims, 13 Drawing Sheets

(51) Int. Cl.
*F16L 41/04* (2006.01)
*F16L 41/16* (2006.01)

(58) Field of Classification Search
USPC .................................................. 137/15.13
See application file for complete search history.

(56) References Cited

U.S. PATENT DOCUMENTS

| | | | | |
|---|---|---|---|---|
| 3,495,615 A * | 2/1970 | Weiner | ................. | F16L 41/065 |
| | | | | 137/318 |
| 3,554,217 A * | 1/1971 | Ehrens | .................... | F16L 41/06 |
| | | | | 137/321 |
| 3,756,261 A * | 9/1973 | Minchhoff | ............. | F16L 41/06 |
| | | | | 29/523 |
| 3,815,624 A * | 6/1974 | Mullins | ................. | F16L 41/045 |
| | | | | 137/318 |
| 3,891,150 A * | 6/1975 | Hoff | ..................... | A01G 25/023 |
| | | | | 239/272 |
| 3,954,223 A * | 5/1976 | Wichman | ................ | F16K 15/16 |
| | | | | 239/109 |
| 3,995,655 A * | 12/1976 | Sands | ..................... | F16L 41/06 |
| | | | | 408/67 |
| 4,029,118 A * | 6/1977 | Merideth | ................ | F16L 41/06 |
| | | | | 137/15.13 |
| 4,574,443 A | 3/1986 | Persak et al. | | |
| 4,649,948 A | 3/1987 | Hudson | | |
| 4,790,264 A * | 12/1988 | Lack | ........................ | A01K 7/06 |
| | | | | 119/72.5 |
| 4,809,735 A * | 3/1989 | Volgstadt | .............. | F16L 47/345 |
| | | | | 408/137 |
| 4,955,406 A | 9/1990 | Antoniello | | |
| 5,022,421 A * | 6/1991 | Johnson | ................ | F16L 41/065 |
| | | | | 137/15.13 |
| 6,381,821 B1 | 5/2002 | Panyon, Jr. | | |
| 6,442,820 B1 * | 9/2002 | Mason | ................. | B21D 39/044 |
| | | | | 29/432 |
| 6,581,262 B1 | 6/2003 | Myers | | |
| 9,587,778 B2 * | 3/2017 | Nourian | ................ | F16L 41/065 |
| 2005/0060864 A1 * | 3/2005 | Nikolaidis | .............. | B25B 27/10 |
| | | | | 29/432 |
| 2015/0167884 A1 | 6/2015 | King et al. | | |

* cited by examiner

APPARATUS AND METHOD FOR INSTALLING A FITTING ONTO FLUID LINE

CROSS-REFERENCE TO RELATED APPLICATIONS

This application is the U.S. National Stage of International Application No. PCT/US2022/045761, filed Oct. 5, 2022, which was published in English under PCT Article 21(2), which claims the benefit of U.S. Provisional Application No. 63/255,529, filed Oct. 14, 2021. The prior applications are incorporated by reference herein in their entirety.

FIELD

The present disclosure relates to apparatus and methods for installing a fitting onto a fluid line, and especially to apparatus and methods for forming a hole in a fluid line and installing a fitting into the hole of the fluid line.

BACKGROUND

Typically, a fluid line is connected and in fluid communication with many branch lines through fittings inserted into the fluid line and connected to branch lines. Traditionally, a hole is formed in the fluid line with a first tool, and then the fitting is inserted into the hole formed in the fluid line by hand. The traditional two-step process wastes time and energy and can be difficult.

Accordingly, there is a need to improve traditional apparatus and method for installing fitting onto fluid line.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one representative example, an apparatus for installing a fitting onto a fluid line comprises a main body and a fitting installation member. The main body comprises a base and a guide member, wherein the base comprises a groove extending in a first direction configured to receive at least a portion of the fluid line, wherein the guide member is connected to and spaced apart from the groove of the base, and wherein the guide member comprises a hole extending through the guide member in a second direction. The fitting installation member comprises an elongate shaft and a tip portion, wherein the elongate shaft extends through the hole of the guide member and into the groove of the base member, and wherein the tip portion is smaller than the shaft in a first dimension.

In some examples, the main body further comprises a connecting portion extending between the base and the guide member.

In some examples, the base, the connecting portion, and the guide member of the main body are integrally formed as a unitary structure.

In some examples, the connecting portion comprises a first side portion and a second side portion, and wherein the guide member is fixed between the first side portion and the second side portion.

In some examples, the base comprises a first protrusion and a second protrusion, and wherein the first protrusion and the second protrusion protrude from the base in a third direction.

In some examples, the third direction is perpendicular to the first direction and is perpendicular to the second direction.

In some examples, the fitting installation member further comprises a thread portion, and wherein the thread portion is formed between the elongate shaft and the tip portion.

In another representative example, an apparatus for installing a fitting onto a fluid line comprises a main body and a fitting installation member. The main body comprises a groove extending in a first direction configured to receive at least a portion of the fluid line. The fitting installation member comprises an elongate shaft and a tip portion, wherein the tip portion is smaller than the shaft in a width dimension.

In some examples, the fitting installation member further comprises a handle, wherein the elongate shaft is connected to the tip portion on a first side of the elongate shaft, and wherein the elongate shaft is connected to the handle on a second side of the elongate shaft.

In some examples, the groove comprises a rounded cross-sectional profile taken in a plane perpendicular to a longitudinal axis of the groove.

In some examples, the fitting installation member comprises a thread portion, and wherein the thread portion is formed between the elongate shaft and the tip portion.

In another representative example, a method for installing a fitting onto the fluid line comprises the steps of: inserting a fluid line into a groove of a fitting installation tool, wherein the fitting installation tool comprises a main body and a fitting installation member, and wherein the groove is formed in the main body and is configured to receive at least a portion of the fluid line; inserting the fitting installation member through the fitting; advancing the fitting installation member to the fluid line to pierce into the fluid line; advancing a nipple portion of the fitting into the fluid line; and retracting the fitting installation member from the fluid line, leaving the fitting coupled to the fluid line.

In some examples, the fitting installation member comprises an elongate shaft and a tip portion, and wherein when inserting the fitting installation member through the fitting, at least a portion of the tip portion passes through the fitting.

In some examples, the groove extends in a first direction, and the shaft and the tip portion extend in a second direction, and wherein when inserting the fitting installation member through the fitting, the first direction is perpendicular to the second direction.

In some examples, the main body further comprises a connecting portion extending between to connect the base with the guide member.

In some examples, the tip portion of the fitting installation member comprises a cone shape end, and wherein when advancing the fitting installation member to the fluid line, the cone shape end pierces into the fluid line.

In some examples, the fitting installation member comprises a thread portion, and wherein the thread portion is formed between the elongate shaft and the tip portion.

In some examples, when inserting the fitting installation member through the fitting, the fitting installation member is engaged with the fitting through the thread portion.

In some examples, the fitting further comprises a value to lock and unlock a fluid path formed within the fitting.

The foregoing and other objects, features, and advantages of the disclosure will become more apparent from the following detailed description, which proceeds with reference to the accompanying figures.

The various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosure will become more apparent from the following detailed description, claims, and accompanying figures.

DETAILED DESCRIPTION

For purposes of this description, certain aspects, advantages, and novel features of examples of this disclosure are described herein. The disclosed methods, apparatus, and systems should not be construed as being limiting in any way. Instead, the present disclosure is directed toward all novel and nonobvious features and aspects of the various disclosed examples, alone and in various combinations and sub-combinations with one another. The methods, apparatus, and systems are not limited to any specific aspect or feature or combination thereof, nor do the disclosed examples require that any one or more specific advantages be present or problems be solved.

Although the operations of some of the disclosed examples are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the term "coupled" generally means physically, mechanically, chemically, magnetically, and/or electrically coupled or linked and does not exclude the presence of intermediate elements between the coupled or associated items absent specific contrary language.

Figure 1:
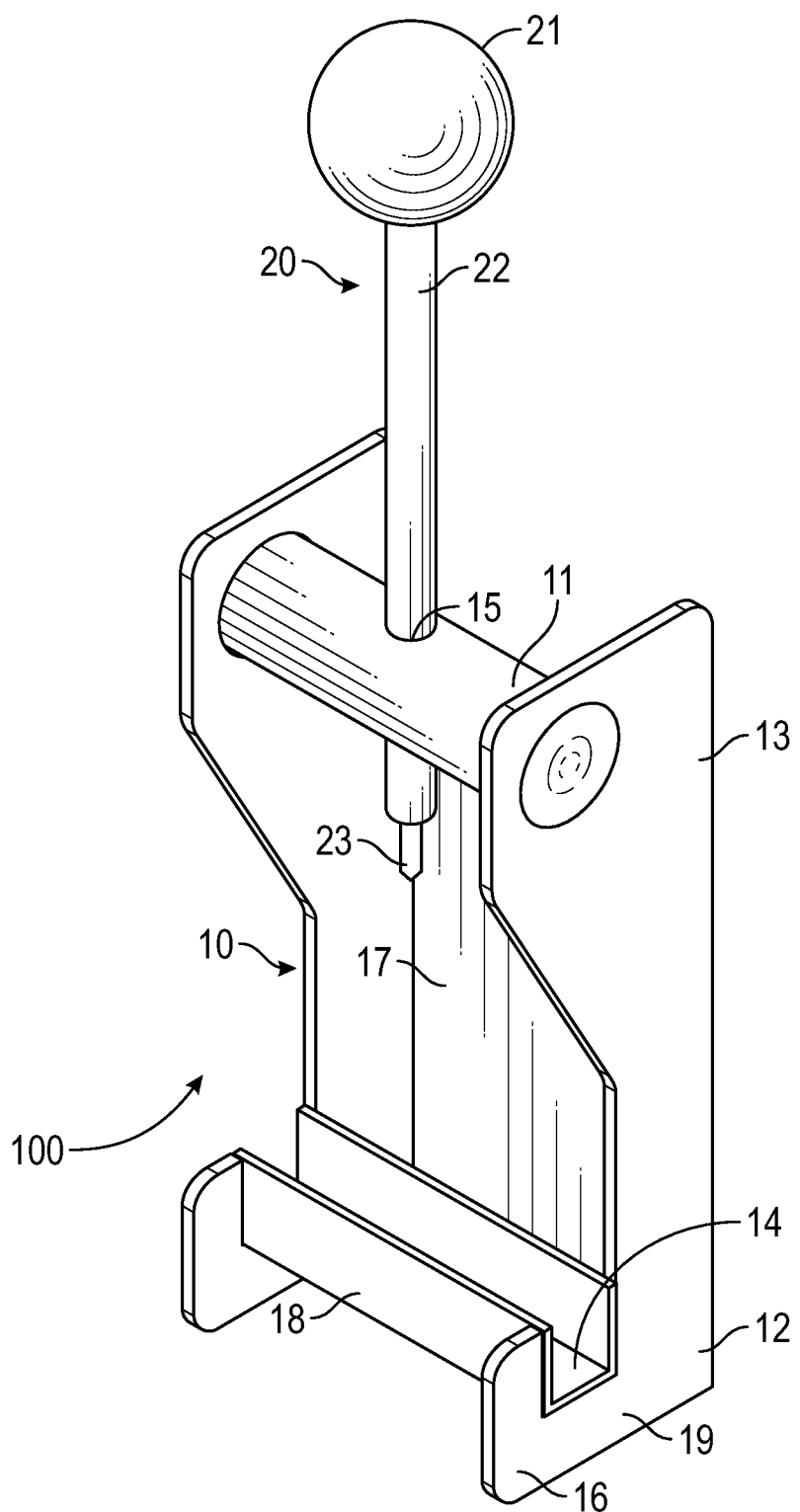
FIG. 1 is a perspective view of an apparatus for installing a fitting onto a fluid line in a non-inserting state, according to one example.
Figure 2:
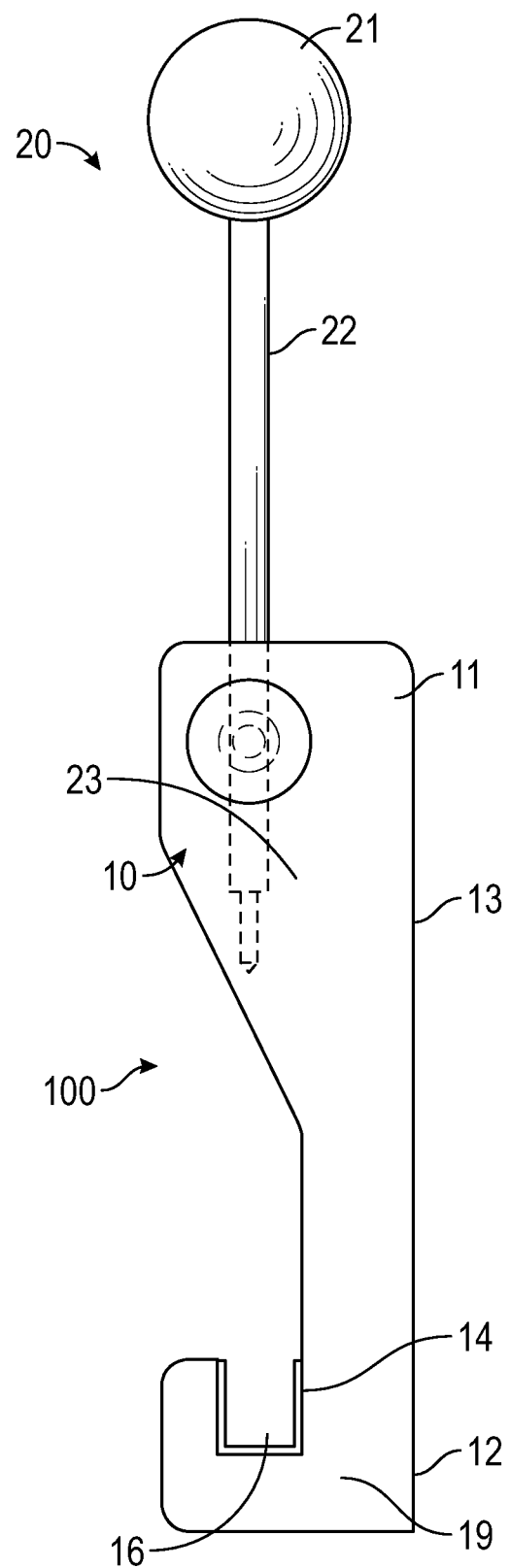
FIG. 2 is a side view of the apparatus of FIG. 1.
Figure 3:
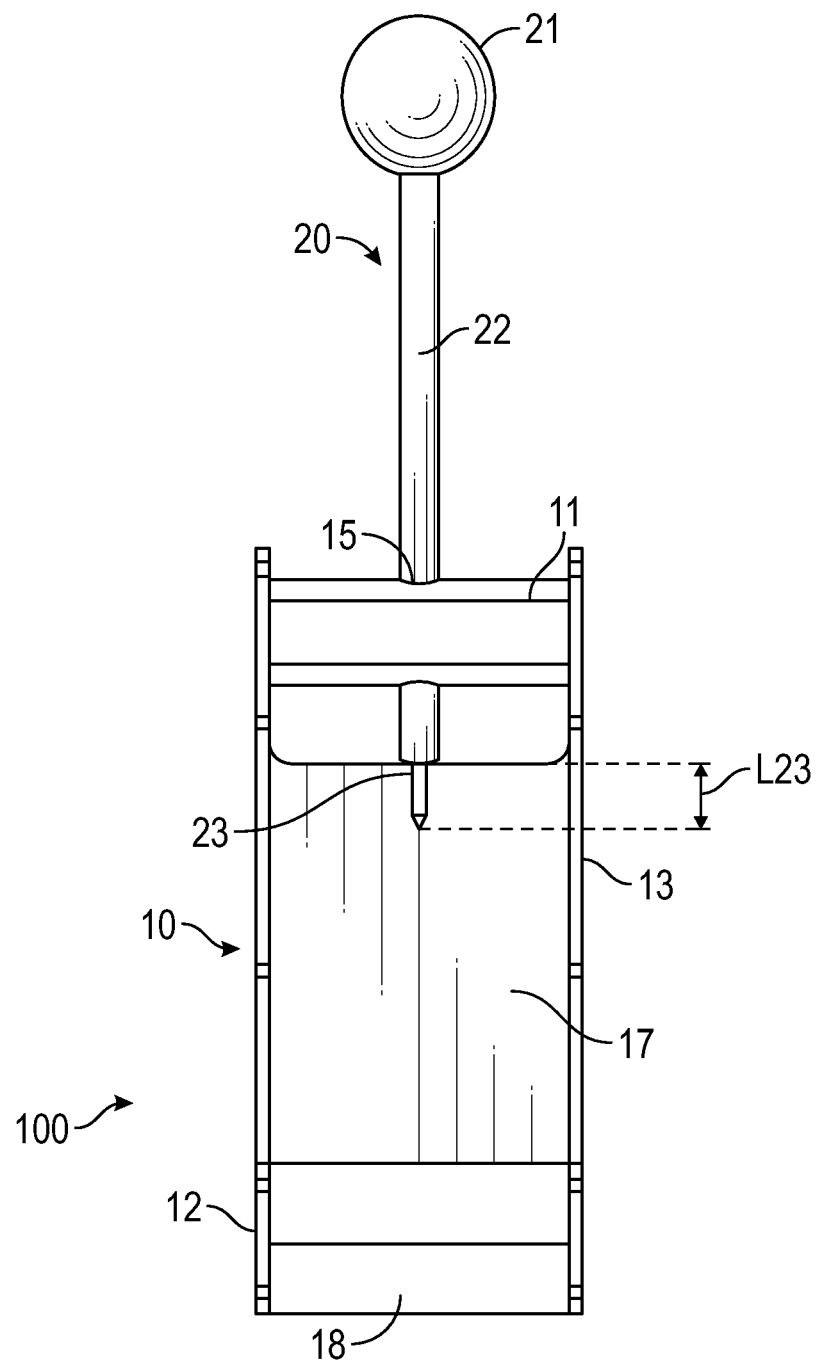
FIG. 3 is a front view of the apparatus of FIG. 1.
Figure 4:
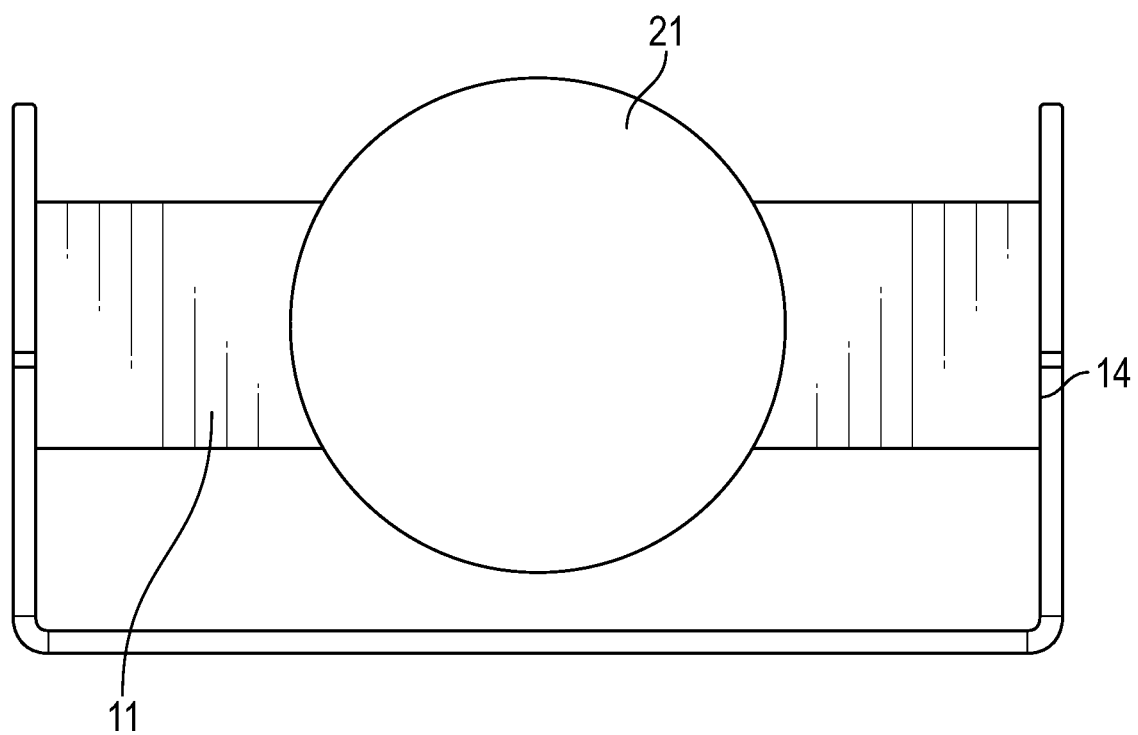
FIG. 4 is a top view of the apparatus of FIG. 1.

FIG. 1 is a perspective view of a fitting installation apparatus 100, according to one example. The apparatus 100 can be used, for example, for installing a fitting into a fluid line. FIG. 1 depicts the apparatus 100 in a non-inserting state with a fitting omitted. FIG. 2 is a side view of the apparatus 100. FIG. 3 is a front view of the apparatus 100. FIG. 4 is a top view of the apparatus 100.

As shown in FIG. 1, the apparatus 100 comprises a main body 10 and a fitting installation member 20. The fitting installation member 20 is movably coupled to the main body 10. The main body 10 is configured to receive and support at least a portion of a fluid line. The fitting installation member 20 is configured to be inserted through a fitting, pierce the fluid line, and insert the fitting into the fluid line.

The fitting installation member 20 of the apparatus 100 comprises a handle 21, a shaft 22, and a tip portion 23. The handle 21 and the shaft 22 can be coupled in a thread manner, in other manner such as adhesive, bonding, etc., or they can be integrally formed as a single, unitary component.

The handle 21 of the fitting installation member 20 has a spherical shape, as shown in FIGS. 1-3. It shall be understood, however, that the handle 21 can have other shapes, such as ellipsoidal shape or cubic shape.

The shaft 22 of the fitting installation member 20 has an elongate shape and can be inserted into the main body 10, as further described below. The shape of the cross section of the shaft 22 is matched with the shape of the hole 15 in the guide member 11. As shown in FIG. 1, the cross section of the shaft 22 and the hole 15 on the guide member 11 both have a circular shape to be matched with each other. Accordingly, the shaft 22 can move axially and rotationally relative to the hole 15. Other shapes are also possible. For example, the cross section of the shaft 22 and the hole 15 in the guide member 11 can both have a non-circular shape (e.g., hexagonal shape, rectangular shape, etc.), to be matched with each other. Such non-circular configurations allow the shaft to move axially relative to the hole but restrict relative rotational movement between the shaft and the hole.

The tip portion 23 of the fitting installation member 20 is formed on the other end of the shaft 22 (i.e., the opposite side of the handle 21). The tip portion 23 is smaller than the shaft 22 in a first dimension, i.e., size in cross section. The shaft 22 and the tip portion 23 can both have a circular cross section, as is shown in FIG. 1 and FIG. 3. However, it should be understood that they can also have other shapes of cross section, such as a non-circular shape. In the example wherein both the shaft 22 and the tip portion 23 have circular cross section, the diameter of the tip portion 23 in its cross section is smaller than the diameter of the shaft 22 in its cross section. There can optionally be a transitional portion formed between the shaft 22 and the tip portion 23, having a diameter decreasing from the diameter of the shaft 22 to the diameter of the tip portion 23. This transitional portion can be omitted.

The tip portion 23 has an end 26 configured to pierce and be inserted into a fluid line. The end can optimally be a tapered and pointed end, or can have other shapes, to be suitable for piercing and/or being inserted into a fluid line.

As is shown in FIGS. 1-3, the main body 10 of the apparatus 100 comprises a guide member 11, a base 12, and two side walls 13. As mentioned above, the main body is configured for supporting a fluid line and for guiding the fitting installation member 20 relative to the fluid line.

The guide member 11 of the main body 10 is used to guide the movement of the shaft 22 of the fitting installation member 20. A hole 15 as described above is provided on the guide member 11, wherein the shaft 22 passes through the hole 15.

The base 12 of the main body 10 comprises a support element 19 having a groove 14 (which can also be referred to as a channel) formed therein. The support element 19 can be configured to support at least a portion of a fluid line. The groove 14 of the support element 19 is sized to accommodate at least a portion of the fluid line along a first direction, and the hole 15 and the shaft 22 passing through the guide member 11 are directed to extend in a second direction intersecting the groove 14. The first direction and the second direction can be perpendicular to each other, such that the shaft 22 and the fitting, which extend in the second direction, are perpendicular to the fluid line, which extend along the first direction.

The main body 10 can optionally comprise one or more side walls (e.g., two side walls 13) to connect the guide member 11 with the base 12. The guide member 11 can extend along the first direction between the two side walls 13. The guide member 11 can be integrally formed with the two side walls or can be coupled with the side walls 13 through, for example, adhesion or welding. Various other means for coupling can be used.

The side walls 13 and the base 12 are coupled, for example, by welding, or can be internally formed. The groove 14 is supported by the base 12 and extends along the first direction between the two side walls. In the example of FIGS. 1-3, the base 12 further comprises two protruding feet 16, to further support the groove 14 and the apparatus 100. In the example of FIGS. 1-3, the main body 10 further comprises a back supporting wall 17 that extends between and connects the two side walls 13, to provide additional support to the whole apparatus.

As is stated above, the side walls 13 can be integrally formed with the guide member 11, the base 12, and the back supporting wall 17. It should be understood that the guide member 11, the base 12, the side walls 13, and the back supporting wall 17 can be made of different materials and be separately produced.

Figure 5:
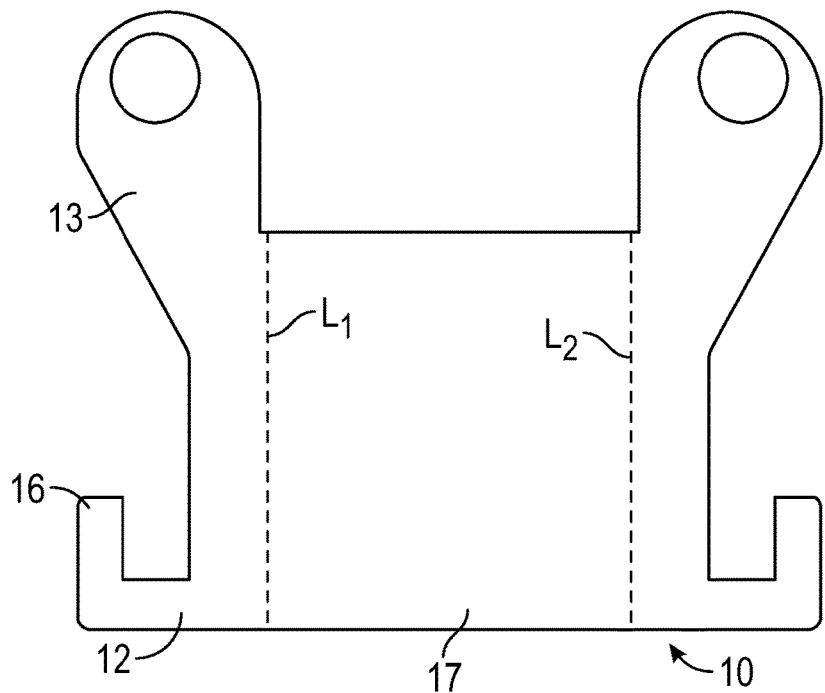
FIG. 5 is a plan view of a base of a main body of the apparatus of FIG. 1, depicting the base in a flat, unfolded view.

FIG. 5 is an expanded and unfolded view of a base of a main body 10 of an apparatus for installing a fitting onto a fluid line according to one example of the invention.

As is shown in FIG. 5, the base 12, the side walls 13, the protruding feet 16, and the back supporting wall 17 are integrally formed as one piece. The one piece is then folded along the line L1 and line L2 to a 90 degree towards a same direction, to form the main body 10 together with the guide member 11 and the groove 14. The guide member 11 and the groove 14, as is shown in FIG. 1, has the same size with the back supporting wall 17 in the first direction, and are coupled to the one piece after it is folded. The guide member 11 and the groove 14 can be coupled to the one piece through adhesion, welding, or other appropriate approaches.

Figure 6:
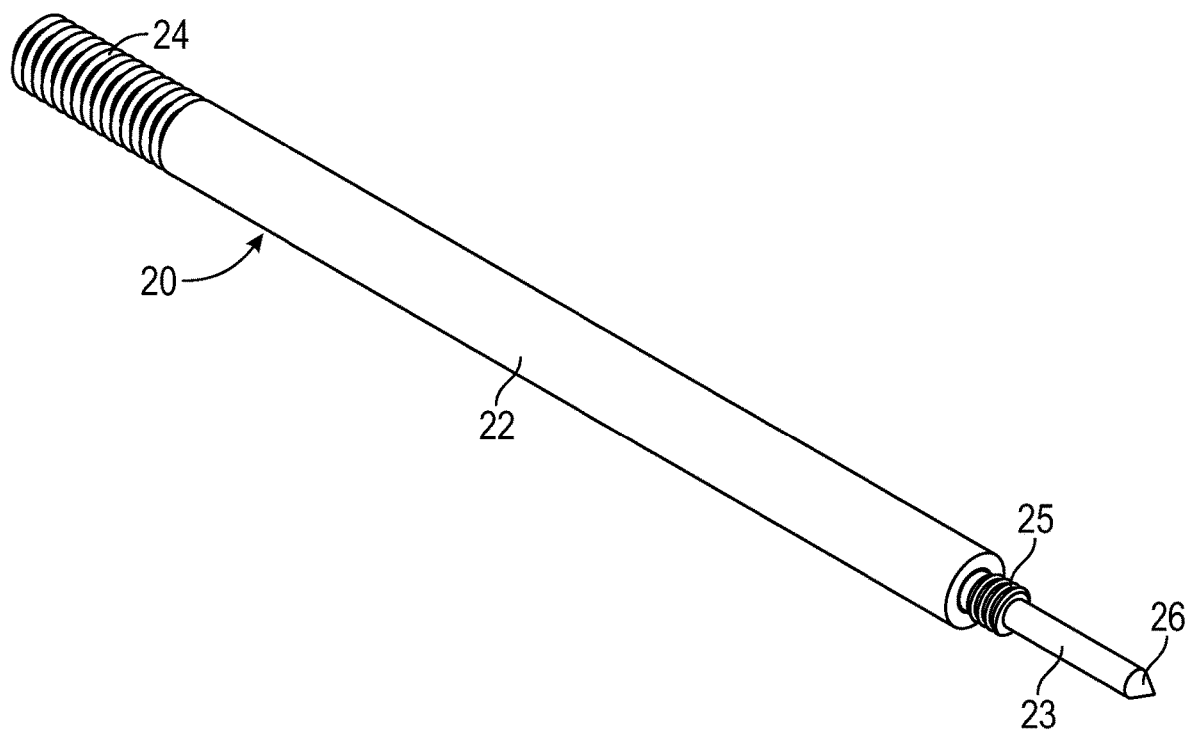
FIG. 6 is a perspective view of part of a fitting installation member of the apparatus of FIG. 1.

FIG. 6 is a perspective view of part of a fitting installation member 20 according to one example.

As is shown in FIG. 6, the shaft 20 of the fitting installation member 20 comprises a thread portion 24, in order to be in thread connection with the handle 21 (shown in FIG. 1) of the fitting installation member 20. It should be understood that the thread portion 24 can be omitted, and the handle 21 and the shaft 22 can be integrally formed.

In some instances, the tip portion 23 can comprise a stepped portion 25. As will be described below, during fitting installation process, the tip portion 23 would be inserted into the fitting. The stepped portion 25 can, for example, be used to adjust the length of the tip portion 23 and the shaft 22 that is inserted into the fitting. In some instances, the stepped portion can comprise threads. The threads can be configured to receive a nut or other component configured to adjust the effective working length of the tip portion 23.

Figure 7:
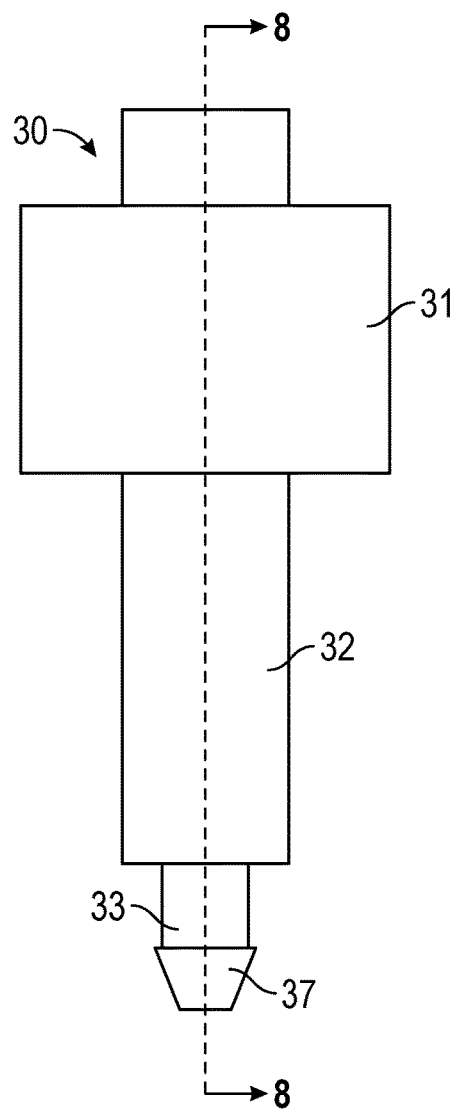
FIG. 7 is a side view of an exemplary fitting, which can be used with the apparatus of the present disclosure.
Figure 8:
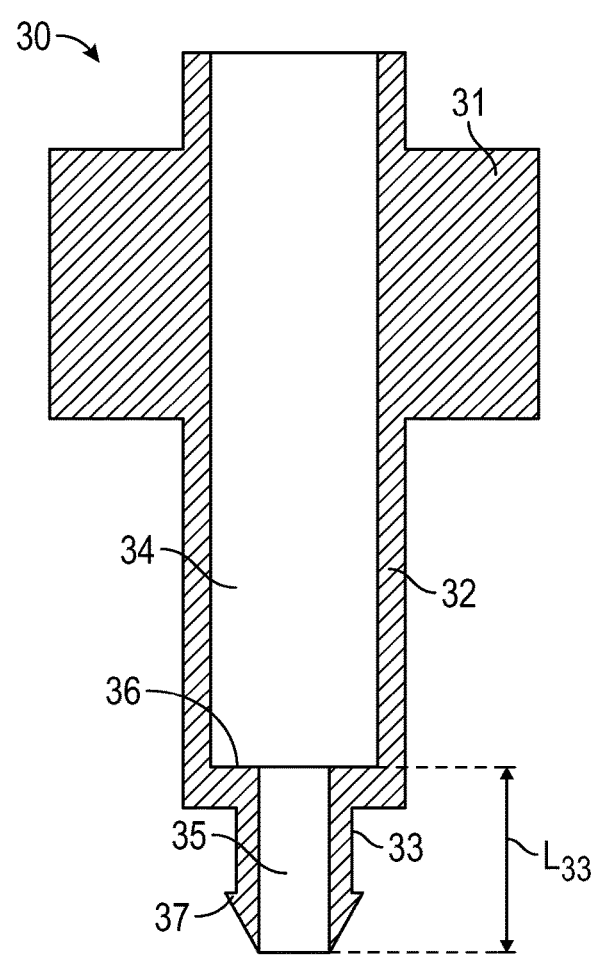
FIG. 8 is a cross-sectional view of the fitting of FIG. 7, taken along the line 8-8 as shown in FIG. 7.

FIG. 7 is a side view of an example of a fitting 30 that can be used with the apparatus 100. FIG. 8 is a section view of the fitting along the line 8-8 shown in FIG. 7.

As is shown in FIG. 7 and FIG. 8, the fitting 30 comprises a boss 31, a sleeve 32, and a nipple portion 33. The boss 31 is threaded connected to the sleeve 32 and is used to connect the sleeve to a branch fluid line after the fitting 30 is installed to a fluid line and after the fitting installation member 20 is removed from the fitting 30 and from the fluid line. The boss 31 fastens the sleeve 32 to the branch fluid line after the sleeve 32 is inserted into the branch fluid line through relative rotation between the boss 31 and the sleeve 32.

When installing the fitting 30 into a fluid line, the sleeve 32 of the fitting 30 surrounds the shaft 22 of the fitting installation member 20. Accordingly, the sleeve 32 is slightly larger than the shaft 20 in the first dimension, to accommodate part of the shaft 22 into the cavity 34 of the sleeve 32.

The nipple portion 33 of the fitting 30 is formed on the end of the sleeve 32, and a cavity 35 is also formed within the nipple portion 33. The cavity 35 formed in the nipple portion 33 is in communication with the cavity 34 formed in the sleeve 32. The nipple portion 33 is smaller than the sleeve 32 in the first dimension, and accordingly, the cavity 35 formed in the nipple portion 33 is smaller than the cavity 34 formed in the sleeve 32 in the first dimension. An annular wall 36 is formed between the cavity 34 in the sleeve 32 and the cavity 35 in the nipple portion 33, such that when the shaft 22 and the tip portion 23 fitting installation member 20 are inserted into the cavity 34 of the fitting 30, the end of the shaft 22 is pressed against the annular wall 36, and the tip portion 23 protrudes into the cavity 35 formed in the nipple portion 33 of the fitting 30. The tip portion 23 is larger than the nipple portion 33 in a second dimension, i.e., the length of the tip portion 23 L23 as shown in FIG. 3 is larger than the length of the nipple portion L33 as shown in FIG. 8, such that the tip portion 23 extends in the cavity 35 formed in the nipple portion 33 and protrudes out from nipple portion 33.

Figure 9:
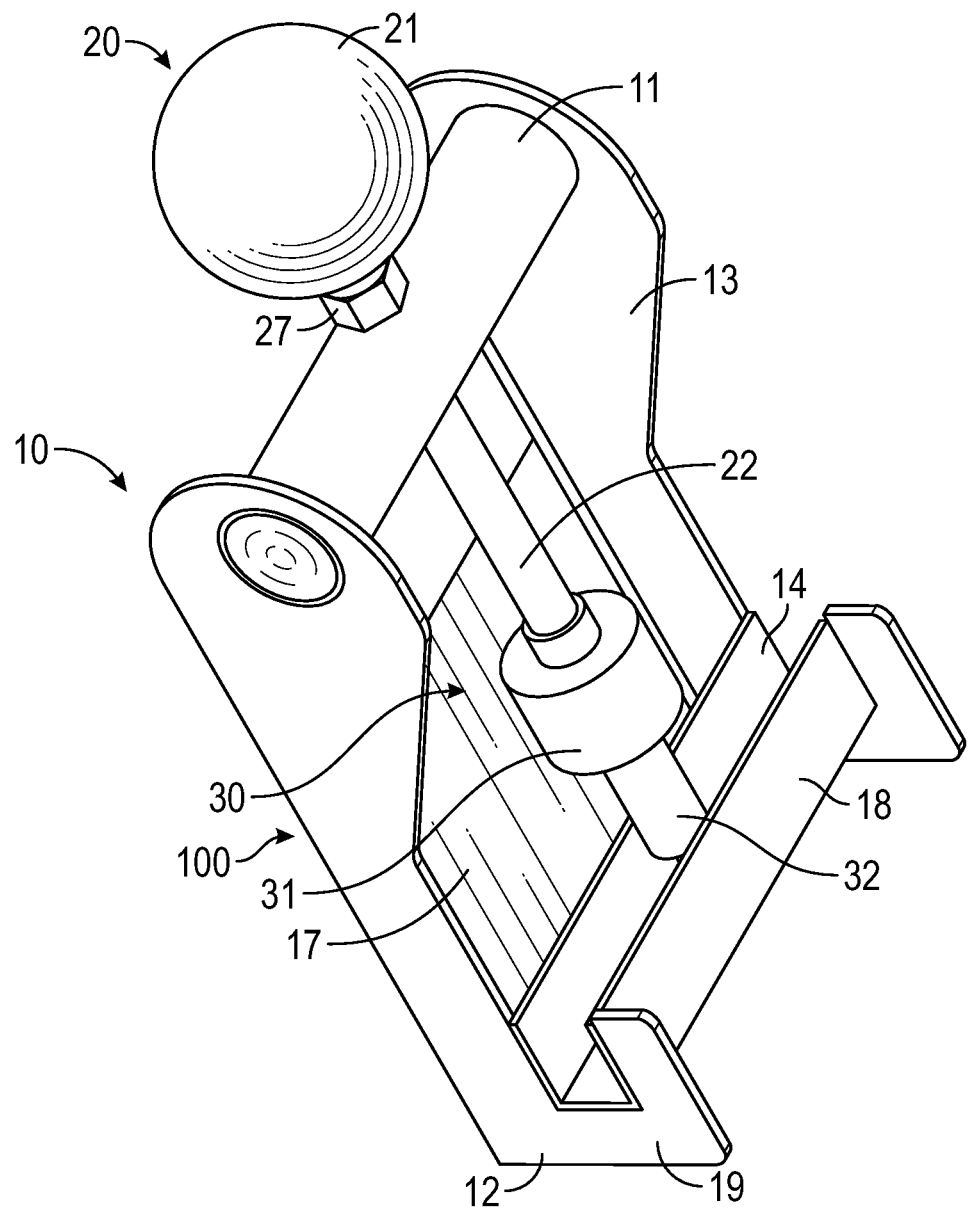
FIG. 9 is a perspective view of the apparatus of FIG. 1 with the fitting of FIG. 7 mounted thereon.
Figure 10:
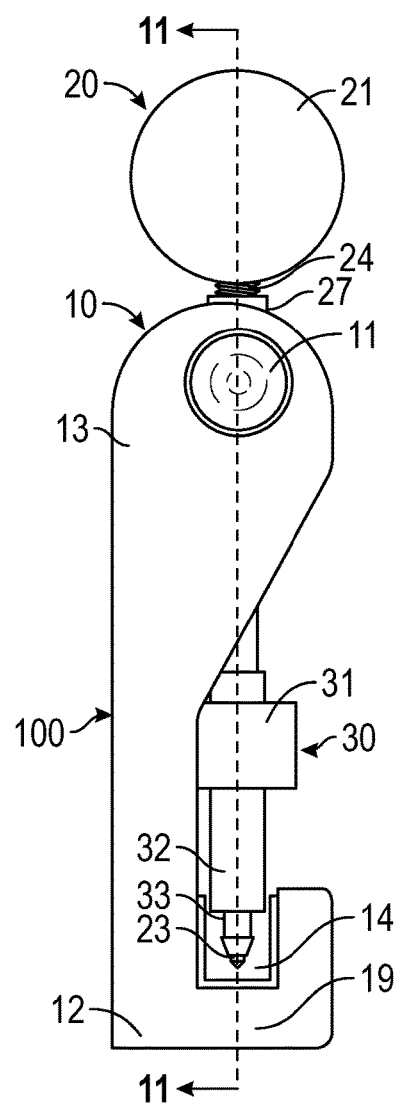
FIG. 10 is a side view of the apparatus of FIG. 1 with the fitting of FIG. 7 mounted thereon.
Figure 11:
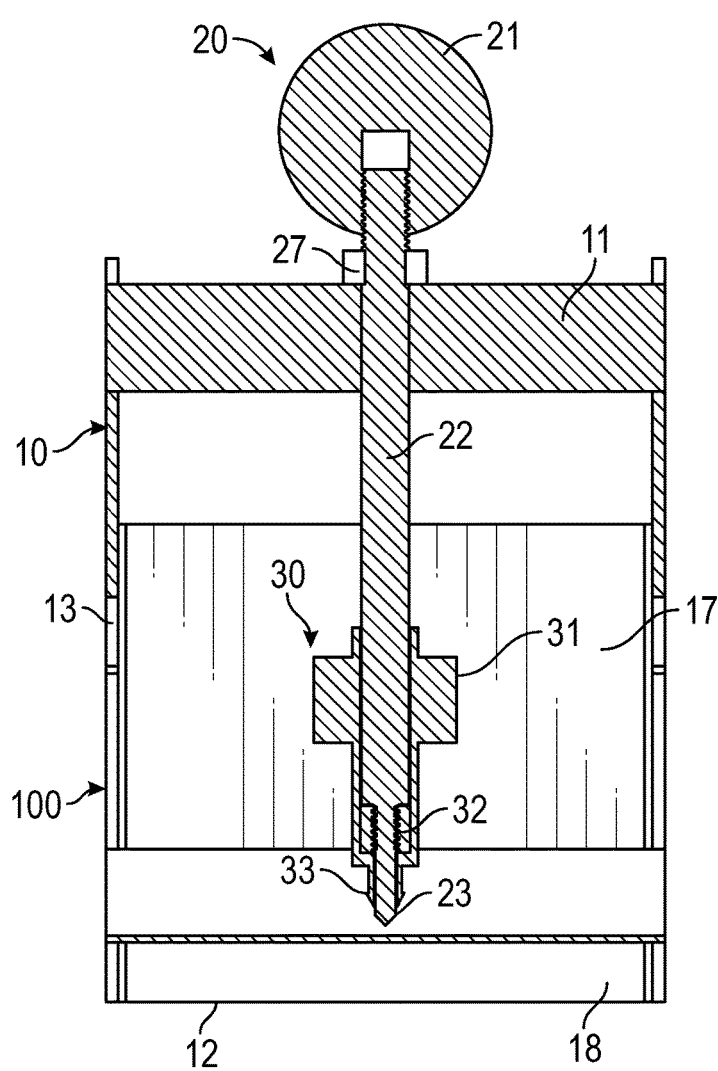
FIG. 11 is a cross-sectional view of the apparatus of FIG. 1 with the fitting of FIG. 7 mounted thereon, taken along the line 11-11 as shown in FIG. 10.

FIG. 9 is a perspective view of an apparatus for installing a fitting onto a fluid line, with fitting 30 installed, according to one example of the invention. FIG. 10 is a side view of the apparatus for installing the fitting 30 onto a fluid line in FIG. 9. FIG. 11 is a section view of the apparatus for installing the fitting 30 onto a fluid line along the Line 11 in FIG. 10.

As is shown in FIGS. 9-11, the fitting 30 is disposed on the fitting installation member 20 such that the shaft 22 is partially inserted into the cavity 34 of the fitting 30.

When installing the fitting 30 onto a fluid line, the shaft 22 first passes through the hole 15 formed on the guide member 11. Then the shaft 22 is then partially inserted into the cavity 34 of the fitting 30, such that the tip portion 23 extends through the nipple portion 33 of the fitting 30. A fluid line can be disposed within the groove 14 of the base 12. The fitting installation member 20 is further advanced together with the fitting 30 to the fluid line, and part of the tip portion 23 that protrudes out from the nipple portion 33 of the fitting 30 is inserted into the fluid line.

In the depicted example, the outer surface of the shaft 22 and the hole 15 are smooth such that the shaft 22 of the fitting installation member 20 can move axially and/or rotationally relative to the guide member 11 of the main body 10. In this manner, the shaft 22 is moved axially relative to the guide member 11 (and a fitting relative to a fluid line) by pushing or pulling the shaft 22 (e.g., via the handle).

In other examples, the shaft 22 and the hole 15 can comprise a threaded connection. In such instances, the shaft 22 can be rotated in a first direction (e.g., clockwise) relative to the guide member 11 to advance the shaft axially relative to the guide member 11 (and a fitting relative to a fluid line), and the shaft 22 can be rotated in a second direction (e.g., counterclockwise) relative to the guide member 11 to retract the shaft axially relative to the guide member 11. The thread connection between the shaft 22 and the guide member 11 may be advantageous for relatively thicker fluid lines, users with less strength, and/or when more precision is required. In some instances, the handle 21 of the shaft can comprise an elongate shape to provide leverage for rotating the shaft 22 relative to the guide member 11. In some instances, the handle 21 and the shaft can comprise a "T" shape.

As can be seen in FIG. 10 and FIG. 11, when the tip portion 23 of the fitting installation member 20 is inserted into the fluid line, as the fitting installation member 20 continues to move towards the groove 14 and the fluid line accommodated therein, the shaft 22 presses the annular wall 36 inside the fitting 30 and thus the fitting 30 continues to advance to the fluid line. Accordingly, the fluid line is pierced by the tip portion 23 and at least a part of the nipple portion 33 of the fitting 30 is inserted into fluid line with the tip portion 23 of the fitting installation member 20. When the fitting installation member 20 is withdrawn, a locking portion 37 (see FIGS. 7-8) of the fitting 30 prevents the fitting 30 from retracting out of the fluid line with the fitting installation member 20. As a result, the fitting 30 is coupled to the fluid line.

As is shown in FIGS. 9-11, a screw member 27 can be optionally formed on the shaft 22, to be in thread engagement with the thread portion 24 of the shaft 22. The screw member 27 is used to adjust the length of the shaft 22 that can pass through the hole 15 of the guide member 11. Thus, the length of the tip portion 23 that can be inserted in the groove 14 can be adjusted by the screw member 27. In other words, the screw member 27 acts as a stopper that restricts movement of the shaft 22 of the fitting installation member 20 relative to the guide member 11 of the main body 10.

Traditionally, a piercing tool is first inserted into the fluid line to form a hole therein, and then the fitting 30 is inserted into the hole. Accordingly traditional approach would be time consuming. By using the apparatus (e.g., the apparatus 100) and method disclosed herein, a user can install the fitting in a single step in which the fluid line is pierced and the fitting is secured to the fluid line. Additionally, the fluid line is supported, thereby reducing the likelihood of kinking. Further, the apparatus is safer than a typical tool because the piecing element is guided by the main body and guarded by the base. As yet another advantage, it is easier to place the fittings along the fluid line in a consistent and uniform manner. As such, the disclosed apparatus and methods save time and make it easier to install fitting into a fluid line.

Figure 12A:
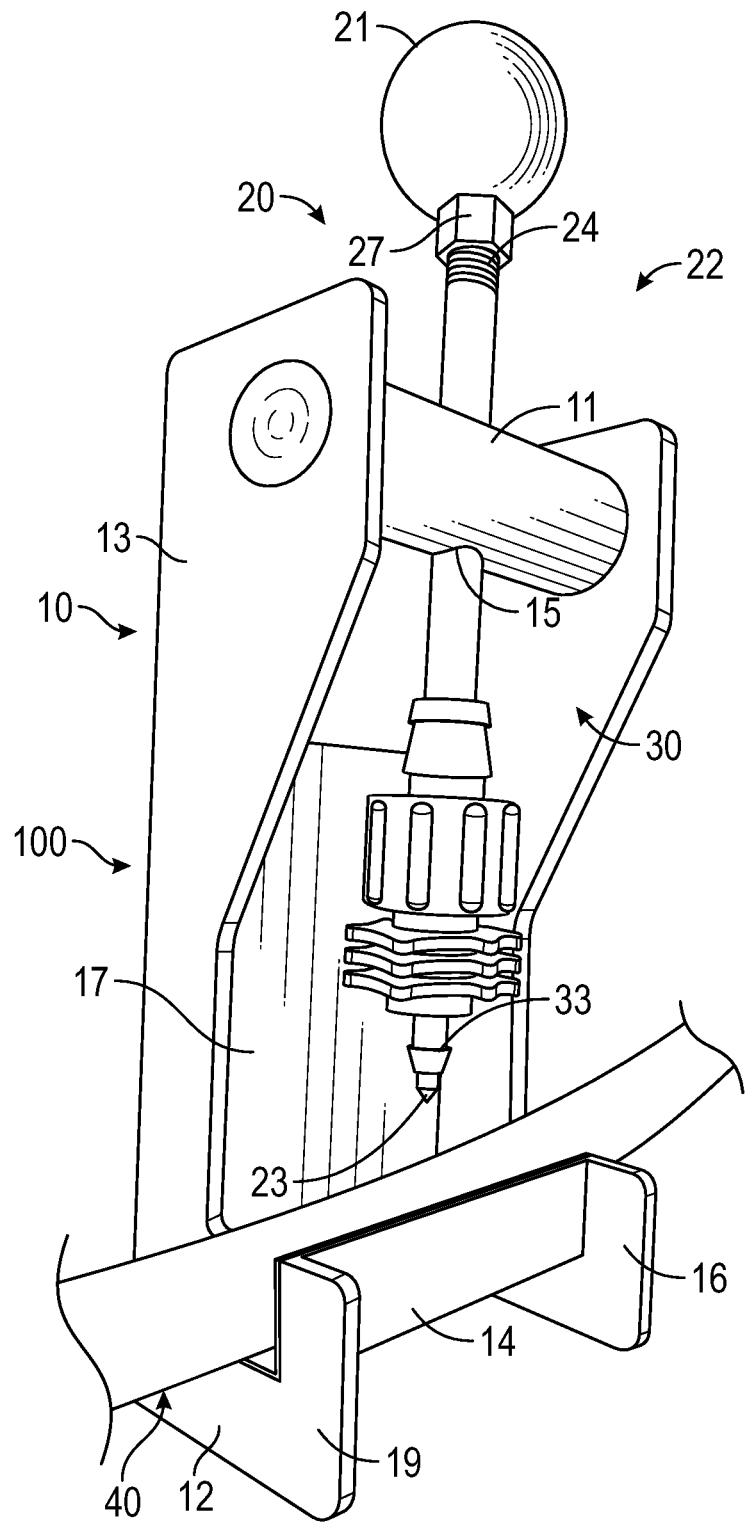
FIG. 12A is a perspective view of the apparatus of FIG. 1, together with an exemplary fitting and fluid line, and depicting the apparatus in an exemplary non-inserting state.
Figure 12B:
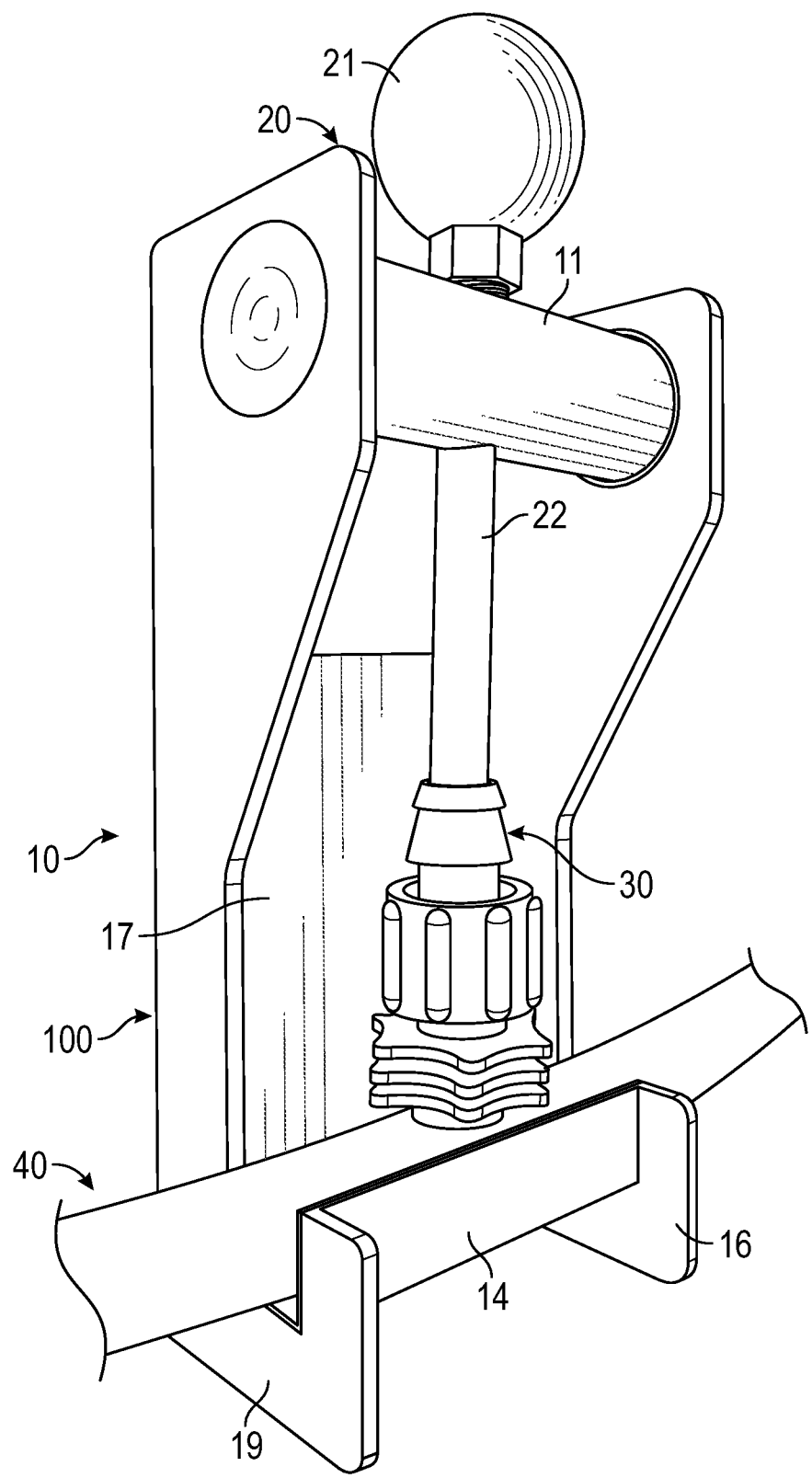
FIG. 12B is a perspective view of the apparatus of FIG. 1, together with an exemplary fitting and fluid line, and depicting the apparatus in an exemplary inserted state.
Figure 12C:
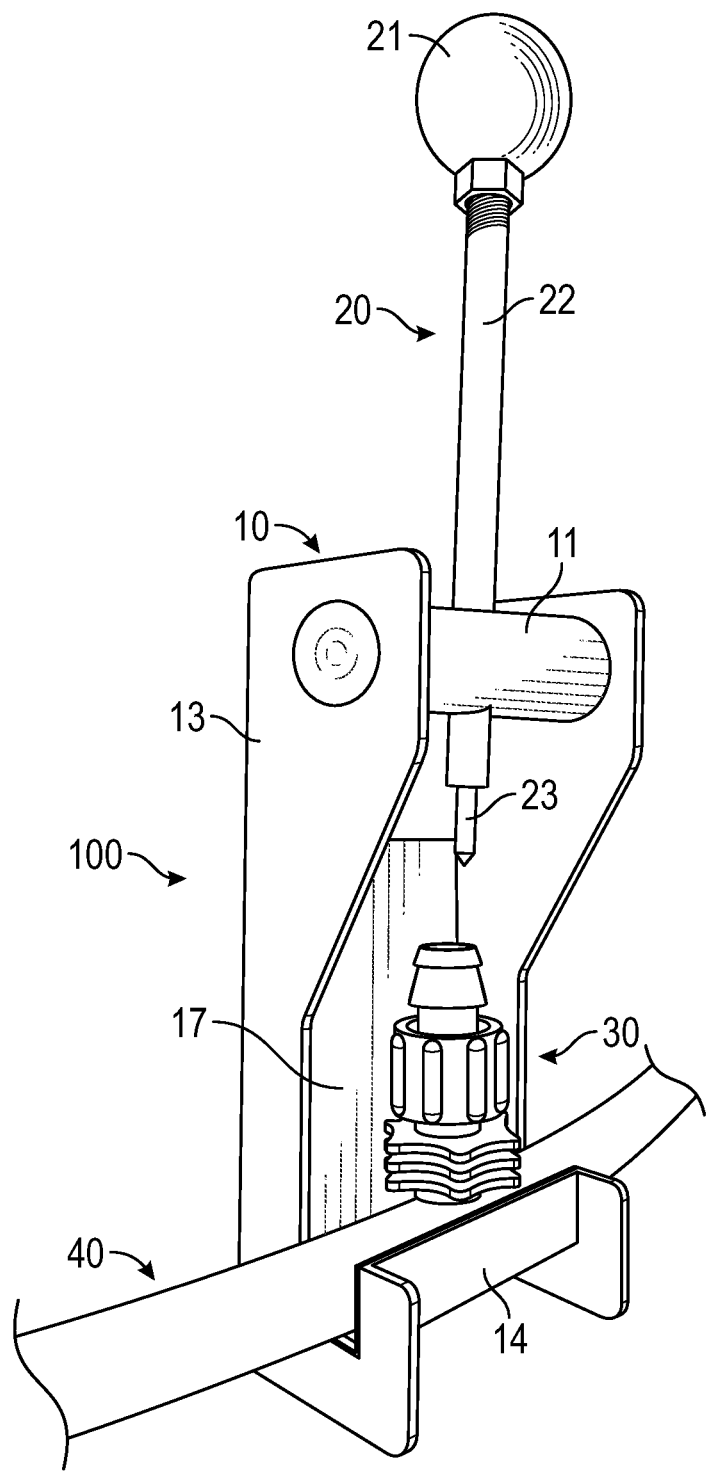
FIG. 12C is a perspective view of the apparatus of FIG. 1, together with an exemplary fitting and fluid line, and depicting the apparatus in an exemplary retracted state and the fitting installed in the fluid line.
Figure 12D:
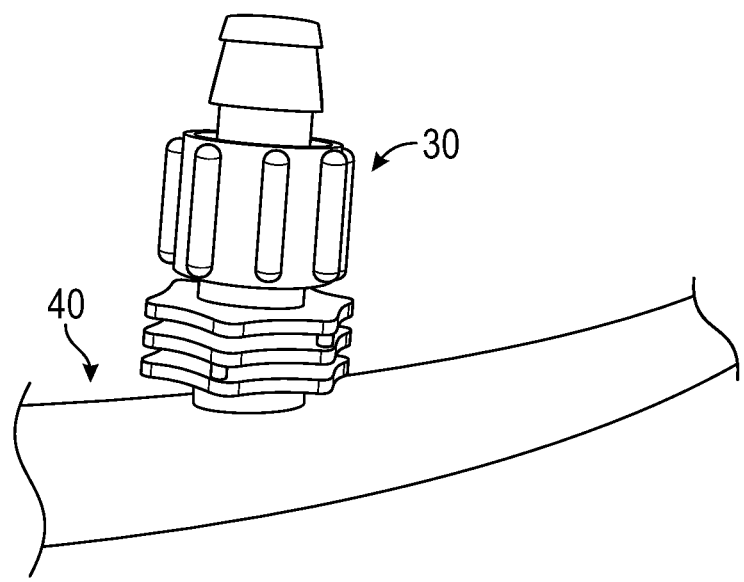
FIG. 12D is a perspective view of the fitting installed in the fluid line after the apparatus of FIG. 1 has been removed.

FIG. 12A is a perspective view of an apparatus for installing a fitting onto a fluid line in a non-inserting state, according to one example of the application. FIG. 12B is a perspective view of the apparatus for installing a fitting onto a fluid line in FIG. 12A, in an inserted state, according to one example of the application. FIG. 12C is a perspective view of the apparatus for installing a fitting onto a fluid line in FIG. 12A, with the fitting in an inserted state and the fitting installation member removed from the fitting and from the fluid line, according to one example of the application. FIG. 12D is a perspective view of the apparatus for installing a fitting onto a fluid line in FIG. 12A, with the fitting in an inserted state and the apparatus removed, according to one example of the application.

As is shown in FIG. 12A, the fitting 30 is disposed on the fitting installation member 20 such that the shaft 22 is partially inserted into the cavity 34 of the fitting 30. The tip portion 23 of the fitting installation member 20 extends through the nipple portion 33 of the fitting 30. A fluid line 40 is disposed within the groove 14 of the base 12.

In FIG. 12B, the fitting installation member 20 is further advanced together with the fitting 30 to the fluid line, and part of the tip portion 23 that protrudes out from the nipple portion 33 of the fitting 30 is inserted into the fluid line. When the tip portion 23 of the fitting installation member 20 is inserted into the fluid line, as the fitting installation member 20 continues to move towards the groove 14 and the fluid line accommodated therein, the shaft 22 presses the annular wall 36 inside the fitting 30 and thus the fitting 30 continues to advance to the fluid line. Accordingly, the fluid line 40 is pierced by the tip portion 23 and at least a part of the nipple portion 33 of the fitting 30 is inserted into fluid line with the tip portion 23 of the fitting installation member 20.

In FIG. 12C, when the fitting installation member 20 is withdrawn, the fitting 30 is coupled to the fluid line 40.

In FIG. 12D, the fitting 30 continues to be coupled to the fluid line 40, and the apparatus 100 is removed from the fitting 30 and from the fluid line 40.

Figure 13:
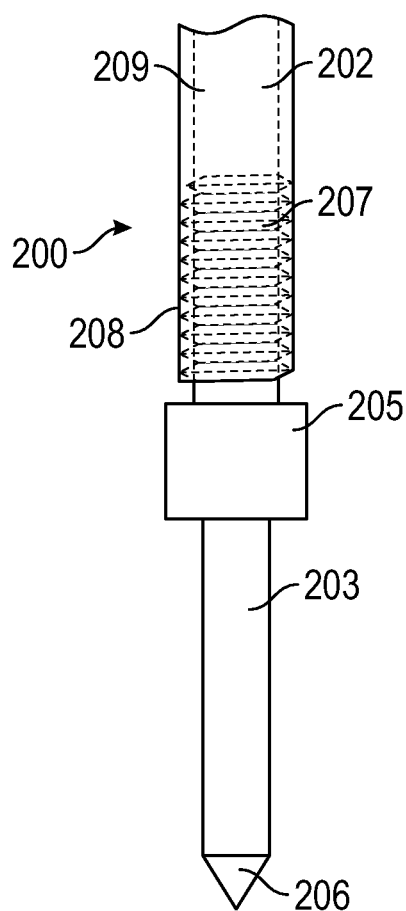
FIG. 13 is a partial side view of part of a fitting installation member according to another example.

FIG. 13 is a side view of a portion of a fitting installation member 200 according to another example. The fitting installation member 200 functions similar to the fitting installation member 20 and can be used, for example with the apparatus 100 in lieu of the fitting installation member 20. One difference between the fitting installation member 200 and the fitting installation member 20 is that the fitting installation member 200 comprises an adjustable and/or replaceable tip portion 203.

The fitting installation member 200 comprises a shaft 202 and the replaceable tip portion 203.

In this example, an internal thread portion 208 is formed in a cavity 209 of the shaft 202, and a matching external thread portion 207 is formed on the tip portion 23. The tip portion 203 can be removed from the shaft 202, making replacement of the tip portion 203 to be easy.

In some examples, the tip portion 203 can comprise a flange member 205 extending radially outwardly relative to one or more other sections of the tip portion 203. The flange member can be configured to contact in interior shoulder of a fitting. In some examples, the flange member 205 movable relative to the tip portion (e.g., via a threaded connection). In this manner, the flange member can be used to adjust the effective length of the tip portion 203 that is inserted into a fitting.

Figure 14:
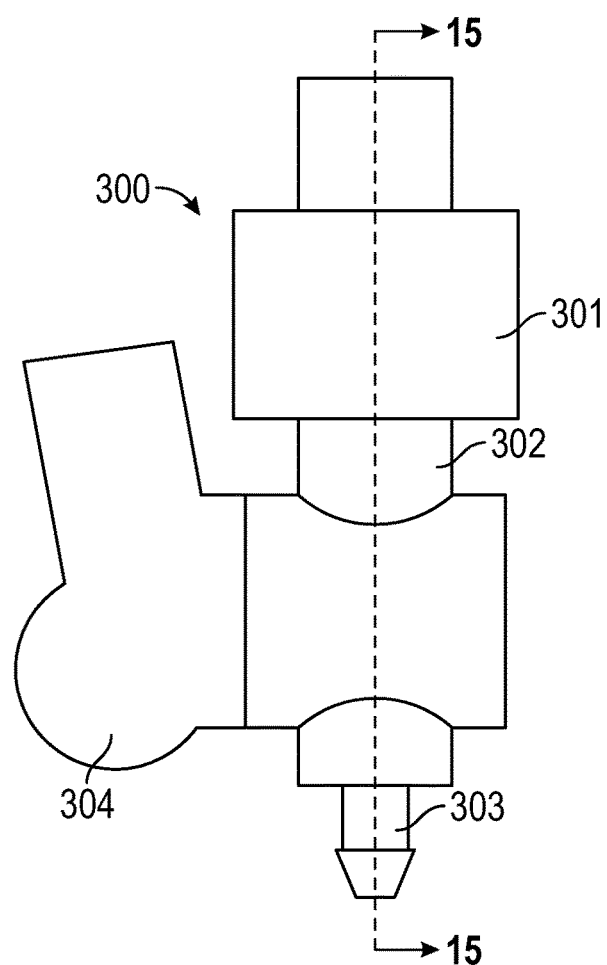
FIG. 14 is a side view of another exemplary fitting, which can be used with the apparatus of the present disclosure.
Figure 15:
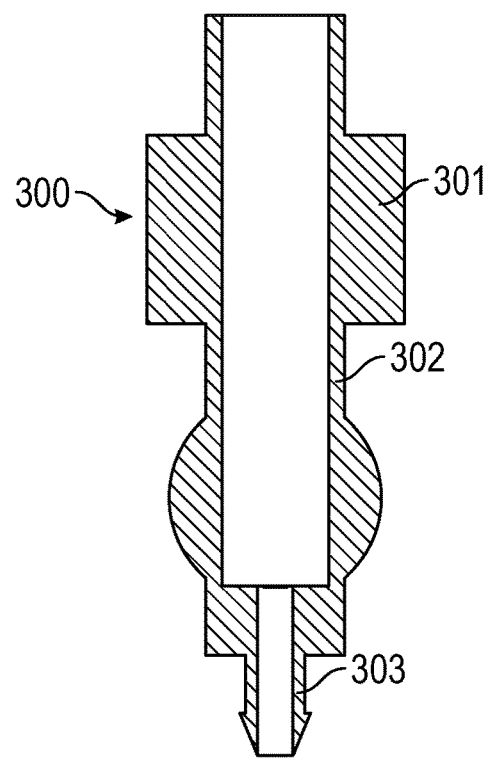
FIG. 15 a cross-sectional view of the fitting of FIG. 14, taken along the line 15-15 as shown in FIG. 14.

FIG. 14 is s side view of a fitting 300 according to another example. FIG. 15 a section view of the fitting 300 along the line 15-15 in FIG. 14.

In this example, a valve 304 is formed on the fitting 300, and the valve 304 can lock or unlock the fluid path within the fitting 300 through rotation.

The disclosed methods, apparatus, and systems should not be construed as limiting in any way. Instead, the present disclosure is directed toward all novel and nonobvious features and aspects of the various disclosed examples, alone and in various combinations and subcombinations with one another. The disclosed methods, apparatus, and systems are not limited to any specific aspect or feature or combination thereof, nor do the disclosed examples require that any one or more specific advantages be present or problems be solved.

In view of the many possible examples to which the principles of the disclosure may be applied, it should be recognized that the illustrated examples are only examples and should not be taken as limiting the scope of the disclosure or claims.

The invention claimed is:

1. An apparatus for installing a fitting onto a fluid line, comprising:
   a main body comprising a base, a guide member, and a connecting portion connecting the base and the guide member, wherein the base comprises a groove extending in a first direction configured to receive at least a portion of the fluid line, wherein the guide member is connected to and spaced apart from the groove of the base, and wherein the guide member comprises a hole extending through the guide member in a second direction, wherein the second direction is perpendicular to the first direction, wherein the base, the connecting portion, and the guide member are integrally formed as a unitary structure, wherein a top opening of the groove is configured for insertion of the fluid line therein and is oriented toward the guide member; and
   a fitting installation member that is moveable between a non-inserting position and an inserting position, wherein the fitting installation member comprises an elongate shaft and a tip portion, wherein the elongate shaft extends through the hole of the guide member such that a longitudinal axis of the fitting installation member extends in the second direction as it moves between the non-inserting position and the inserting position, and wherein, in the inserting position of the fitting installation member, the tip portion extends into the groove of the base and, in the non-inserting position, the tip portion is spaced apart from the groove of the base, and wherein the tip portion is smaller than the elongate shaft in a first dimension.

2. The apparatus of claim 1, wherein the connecting portion comprises a first side portion and a second side portion, and wherein the guide member is fixed between the first side portion and the second side portion.

3. The apparatus of claim 1, wherein the base comprises a first protrusion and a second protrusion, and wherein the first protrusion and the second protrusion protrude from the base in a third direction.

4. The apparatus of claim 3, wherein the third direction is perpendicular to the first direction and is perpendicular to the second direction.

5. The apparatus of claim 1, wherein the fitting installation member further comprises a thread portion, and wherein the thread portion is formed between the elongate shaft and the tip portion.

6. An apparatus for installing a fitting onto a fluid line, comprising:
   a main body, wherein the main body comprises a base, a guide member, and a connecting portion connecting the base and the guide member, wherein the base comprises a groove extending in a first direction configured to receive at least a portion of the fluid line, wherein the groove defines top opening that extends in the first direction along a length of the groove, wherein the top opening is oriented toward the guide member, wherein the guide member comprises a hole extending through the guide member in a second direction that is perpendicular to the first direction, wherein the base and the connecting portion are integrally formed as a unitary structure, and wherein a position of the base is fixed relative to the guide member; and
   a fitting installation member that is moveable between a non-inserting position and an inserting position, wherein the fitting installation member comprises an elongate shaft and a tip portion, wherein the tip portion is smaller than the elongate shaft in a width dimension, wherein the elongate shaft extends through the hole of the guide member;
   wherein, in the inserting position of the fitting installation member, the tip portion extends through the top opening and into the groove of the base and, in the non-inserting position, the tip portion is spaced apart from the groove of the base;
   wherein a longitudinal axis of the fitting installation member extends in the second direction as the fitting installation member moves between the non-inserting position and the inserting position.

7. The apparatus of claim 6, the fitting installation member further comprising a handle, wherein the elongate shaft is connected to the tip portion on a first side of the elongate shaft, and wherein the elongate shaft is connected to the handle on a second side of the elongate shaft.

8. The apparatus of claim 6, wherein the groove comprises a rounded cross-sectional profile taken in a plane perpendicular to a longitudinal axis of the groove.

9. The apparatus of claim 6, wherein the fitting installation member comprises a thread portion, and wherein the thread portion is formed between the elongate shaft and the tip portion.

10. A method for installing a fitting onto a fluid line, comprising:
    moving a fitting installation member of a fitting installation tool into a non-inserting position, wherein the fitting installation tool comprises the fitting installation member and a main body, wherein the main body comprises a base, a guide member, and a connecting portion connecting the base and the guide member, wherein the based and the guide member are integrally formed as unitary structure, wherein a position of the base is fixed relative to the guide member, wherein the base comprises a groove that extends first direction, wherein the guide member comprises a hole extending through the guide member in a second direction, wherein the second direction is perpendicular to the first direction, wherein the fitting installation member comprises an elongate shaft and a tip portion, wherein the elongate shaft extends in the second direction through the hole of the guide member such that a longitudinal axis of the fitting installation member is perpendicular to the first direction, wherein, in the non-inserting position, the tip portion is spaced apart from the groove;

inserting the fluid line through a top opening of the groove of the base of the fitting installation tool, wherein the top opening is oriented toward the guide member, wherein the groove is configured to receive at least a portion of the fluid line;

inserting at least the tip portion of the fitting installation member through the fitting;

moving the fitting installation member from the non-inserting position to an inserting position along a pathway extending in the second direction, the moving the of the fitting installation member to the inserting position resulting in advancing the tip portion into the groove and to the fluid line to pierce into the fluid line;

advancing a nipple portion of the fitting into the fluid line; and retracting the fitting installation member from the inserting position to the non-inserting position, the retracting resulting in leaving the fitting coupled to the fluid line.

11. The method of claim 10, wherein the tip portion of the fitting installation member comprises a cone shape end, and wherein when advancing the fitting installation member to the fluid line, the cone shape end pierces into the fluid line.

12. The method of claim 10, wherein the fitting installation member comprises a thread portion, and wherein the thread portion is formed between the elongate shaft and the tip portion.

13. The method of claim 12, wherein when inserting the fitting installation member through the fitting, the fitting installation member is engaged with the fitting through the thread portion.

14. The method of claim 10, wherein the fitting further comprises a valve to lock and unlock a fluid path formed within the fitting.

15. The apparatus of claim 5, wherein the elongate shaft, the threaded portion, and the tip portion are in a side-by-side linear arrangement along the longitudinal axis of the fitting installation member.

16. The apparatus of claim 15, further comprising a nut threadedly engaged with the threaded portion, wherein the nut is configured to move axially relative to the elongate shaft to adjust an effective working length of the tip portion.

17. The apparatus of claim 9, wherein the threaded portion is a first threaded portion and the fitting installation member further comprises a second threaded portion at a top end portion of the fitting installation member.

18. The apparatus of claim 17, further comprising a first nut threadedly engaged with the first threaded portion and a second nut threadedly engaged with the second threaded portion.

19. The apparatus of claim 18, wherein the first nut is configured to move axially relative to the elongate shaft to adjust a distance that the tip portion is inserted into the groove of the base in the inserting position; and wherein the second nut is configured to move axially relative to elongate shaft to adjust an effective working length of the tip portion.

\* \* \* \* \*